United States Patent [19]
Stiegler et al.

[11] Patent Number: 6,112,072
[45] Date of Patent: Aug. 29, 2000

[54] METHOD FOR ENTERING AND LEAVING A POWER-SAVING OPERATION OF A SUBSCRIBER IN AN ANNULAR COMMUNICATION NETWORK

[75] Inventors: Andreas Stiegler, Ettlingen; Patrick Heck, Durmersheim; Herbert Hetzel, Schwaigen, all of Germany

[73] Assignees: Silicon Systems GmbH Multimedia Engineering, Karlsruhe; Becker GmbH, Karlsbad, both of Germany

[21] Appl. No.: 08/949,651

[22] Filed: Oct. 14, 1997

[30] Foreign Application Priority Data

Oct. 11, 1996 [DE] Germany ............................ 196 42 265

[51] Int. Cl.$^7$ .................................................. H04B 1/16
[52] U.S. Cl. .......................... 455/343; 455/38.3; 455/574
[58] Field of Search ..................................... 455/343, 574, 455/38.3, 403, 422, 517, 575; 370/311, 330, 465, 475, 449, 457; 375/242

[56] References Cited

U.S. PATENT DOCUMENTS

| | | | |
|---|---|---|---|
| 4,577,315 | 3/1986 | Otsuka | 455/343 |
| 5,193,212 | 3/1993 | Son | 455/343 |
| 5,251,325 | 10/1993 | Davis et al. | 455/343 |
| 5,376,975 | 12/1994 | Romero et al. | 455/38.3 |
| 5,384,564 | 1/1995 | Wycoff et al. | 455/343 |
| 5,935,214 | 8/1999 | Stiegler et al. | 370/330 |

Primary Examiner—Dwayne D. Bost
Assistant Examiner—Quochien B. Vuong
Attorney, Agent, or Firm—Herbert L. Lerner; Laurence A. Greenberg; Werner H. Stemer

[57] ABSTRACT

A method for entering and leaving a power-saving operation of a subscriber in an annular communication network includes transmitting data in the communication network in a format that prescribes a pulsed sequence of individual bit groups of identical length in which specific bit positions are reserved for a preamble which is decoded in a receive circuit of each subscriber. During a power-saving operation of a subscriber, at least part of the subscriber which contains the receive circuit remains turned on, and at least one special preamble code is provided, upon the reception of which a part of the subscriber turned off during the power-saving operation is turned on again.

10 Claims, 2 Drawing Sheets

METHOD FOR ENTERING AND LEAVING A POWER-SAVING OPERATION OF A SUBSCRIBER IN AN ANNULAR COMMUNICATION NETWORK

BACKGROUND OF THE INVENTION

FIELD OF THE INVENTION

The invention relates to a method for entering and leaving a power-saving operation of a subscriber in an annular communication network, in which data are transmitted in a format that prescribes a pulsed sequence of individual bit groups of identical length in which specific bit positions are reserved for a preamble that is decoded in a receive circuit of each subscriber. The invention also relates to such a method in a mobile annular communication system, in particular in a motor vehicle.

The subscribers of the communication network are data sources and data sinks which are interconnected through data lines that form a ring feeder. Both source data and control data can be transmitted between the subscribers through the ring feeder by subdividing the bit groups into component bit groups which respectively form a data channel. A clock signal is generated by a single subscriber and transmitted through the net in the form of specific preamble codes which respectively identify the start of a block, which is formed in each case by a combination of a plurality of bit groups. All of the other subscribers detect the block start code and are synchronized with the clock signal with the aid of successive block start codes. It is noted that purely packet-oriented data transmission methods such as, for example, ATM methods, that is to say asynchronous transmission methods, are to be distinguished therefrom.

Such an annular communication network as is described, for example, in Published European Patent Application 0 725 522 A1 serves for networking different types of electric and electronic devices which are intended to exchange information among one another in a partly complicated way, with the aid of data lines of physically simple construction. The subscribers can exchange both source data and control data through those data lines. For example, in the audio field it is possible to transmit audio data from data sources such as CD players, radio receivers and cassette recorders to data sinks such as amplifier/loudspeaker combinations, and control data can be transmitted at the same time, for example to control volume. In that case, a device can be constructed simultaneously as a data source and a data sink, such as is the case with a cassette recorder, for example.

In order to realize power-saving functions in such a communication network, individual subscribers have previously been turned off completely upon external command or after the expiration of a preset time of inactivity. In order to reactivate such a turned-off subscriber, it has been necessary for the entire network to be turned off and turned on again.

It is desirable to be able to reactivate a deactivated subscriber when required, in particular through the use of a subscriber which manages the network, without having to turn off the entire network and turn it on again or without carrying out a reset.

There are special wakeup circuits for such a purpose which monitor the signal on a data line and which react to a specific modulated signal by again turning on the subscriber connected to the wakeup circuit. However, such a circuit, which each subscriber with a power-saving function must have, is relatively expensive and takes up a lot of space in relative terms.

SUMMARY OF THE INVENTION

It is accordingly an object of the invention to provide a method for entering and leaving a power-saving operation of a subscriber in an annular communication network, which overcomes the hereinafore-mentioned disadvantages of the heretofore-known methods of this general type and with which it is possible to realize power-saving functions in an annular communication network in a particularly simple way.

With the foregoing and other objects in view there is provided, in accordance with the invention, a method for entering and leaving a power-saving operation of a subscriber in an annular communication network, which comprises providing subscribers having receive circuits in an annular communication network; transmitting data in a format prescribing a pulsed sequence of individual bit groups of identical length having specific bit positions reserved for a preamble to be decoded in the receive circuit of each subscriber; keeping at least part of a subscriber containing a receive circuit turned on during a power-saving operation of the subscriber; and turning on a part of the subscriber turned off during the power-saving operation, upon reception of at least one special preamble code by the receive circuit.

The invention utilizes the fact that the possible information content of the preamble is not exhausted by the transmission of the clock signal. This holds in general even if further information is transmitted through the use of the preamble, such as the distinction between left-hand and right-hand channels, as is the case in the so-called "SPDIF format (Sony/Philips-Digital-Interface-Format)", the standard data transmission format for CD players. Consequently, the invention delivers an additional control function without loss of transmission capacity.

The receive circuit which is present in each subscriber must be able to decode the preamble completely automatically, in order to synchronize an internal oscillator of the subscriber, with the received clock pulse. For this purpose, the receive circuit contains some hardwired device, for example a switching mechanism, which is connected to a shift register, a FIFO circuit or the like, through which register or circuit each received bit group is directed. A received preamble code is detected, for example as a block start code, with the aid of the switching mechanism, and is processed appropriately.

In accordance with the invention, this receive circuit, which is present in any case, is used in order to reactivate a deactivated subscriber without the need for any further components. In particular, it is not necessary for a microprocessor that is present in the subscriber to remain turned on in order to be able to detect any wakeup signal, nor is there a need for a processor in each subscriber, as in the case of an amplifier/loudspeaker combination, which participates essentially passively in the communication.

When the power-saving operation of a subscriber is entered, only the receive circuit and an internal oscillator of the subscriber need remain turned on. The rest of the subscriber can be turned off. In order to leave the power-saving operation upon the receipt of the special preamble code, the receive circuit actuates some switch which turns on the rest of the subscriber again.

During the power-saving operation, there is certainly a need for a small residual part of the subscriber to remain active, with the result that a low minimum current is required just as in the case of using external wakeup circuits. However, in accordance with the invention, a subscriber with a power-saving function has no need of any external components. Therefore, the internal changes are limited to the fact that the receive circuit additionally detects the wakeup preamble code and is capable of turning on the rest of the subscriber again.

In order to be able to reactivate specific subscribers in a pinpointed fashion, there can be a plurality of special preamble codes which are respectively assigned to a subscriber or a group of subscribers, for example amplifier/loudspeaker combinations connected to the network.

The ring feeder is preferably formed by optical fibers which interconnect two subscribers in each case, and permit high data transmission rates. Moreover, in the case of a communication system in a motor vehicle, the low weight of optical fibers is particularly advantageous. However, the invention is also suitable for purely electric annular communication networks in which the line sections are, for example, coaxial cables.

It has proved effective, in particular, to transfer individual or several of the subscribers, apart from the clock pulse generator, into the power-saving operation by an instruction from the clock pulse generator. Due to the central instruction from the clock pulse generator the latter is always aware of whether one or more and, if appropriate, which subscribers are in the power-saving operation, and thus need to be transferred, if required, from this power-saving operation into the normal operation. It has also proved effective to provide the subscribers which are intended for the power-saving operation, with a unit which ensures that after a fixed time of inactivity of the subscriber, the subscriber goes over into the power-saving operation, preferably communicating this transition in advance to the clock pulse generator through the ring feeder. These two types of transition into the power-saving operation provide two simple and reliable methods for entering and leaving the power-saving operation of subscribers in a communication network.

The use of the above-described methods proves to be particularly relevant in the case of a communication system in a motor vehicle, since it is precisely there that the power consumption of the electric components of the vehicle are to be kept as low as possible, in particular when the motor vehicle is at a standstill. The functionality of the vehicle can be kept reliable by using as low a power consumption as possible, even after lengthy operation of the electric components. Weak car batteries which fail to operate, particularly when starting in winter, are virtually excluded by this invention by virtue of the power consumption of the communication system in the motor vehicle.

Other features which are considered as characteristic for the invention are set forth in the appended claims.

Although the invention is illustrated and described herein as embodied in a method for entering and leaving a power-saving operation of a subscriber in an annular communication network, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
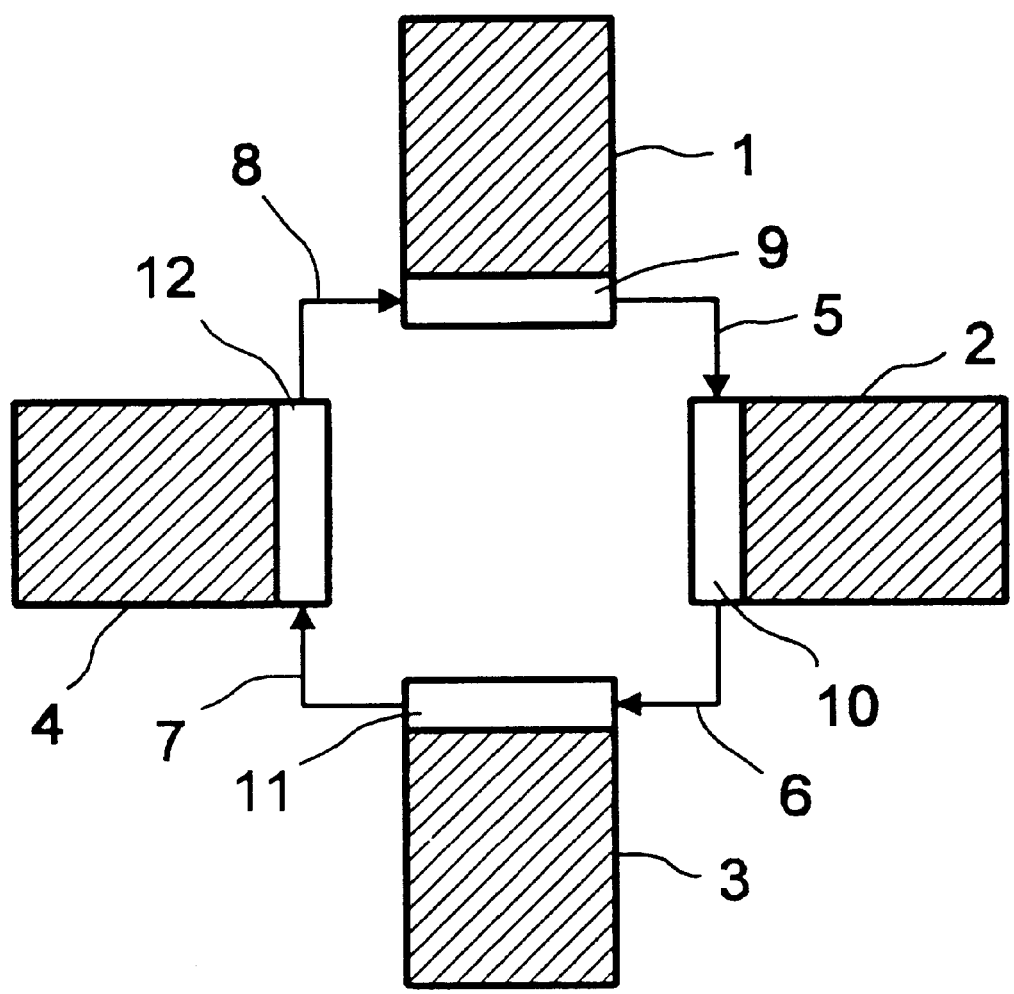
FIG. 1 is a block circuit diagram of an annular communication network with four subscribers.

Referring now to the figures of the drawings in detail and first, particularly, to FIG. 1 thereof, there is seen an annular communication network with a subscriber 1 used as clock pulse generator, and three further subscribers 2, 3 and 4. The four subscribers 1 to 4 are interconnected annularly through optical fibers 5 to 8. The optical fibers 5 to 8 form a ring feeder for a common transmission of source data and control data between the subscribers 1 to 4. The physical direction of the data transmission is represented by arrows.

Each subscriber 1 to 4 contains a receive and transmit circuit 9 to 12, each two of which are interconnected through a respective one of the optical fibers 5 to 8. Each receive and transmit circuit 9 to 12 contains an optoelectronic transducer for receiving optical signals from one of the optical fibers and converting them into electric signals, as well as an optoelectronic transducer for converting electric signals into optical signals which are fed to the optical fiber that is connected to the next subscriber in the ring.

Figure 2:
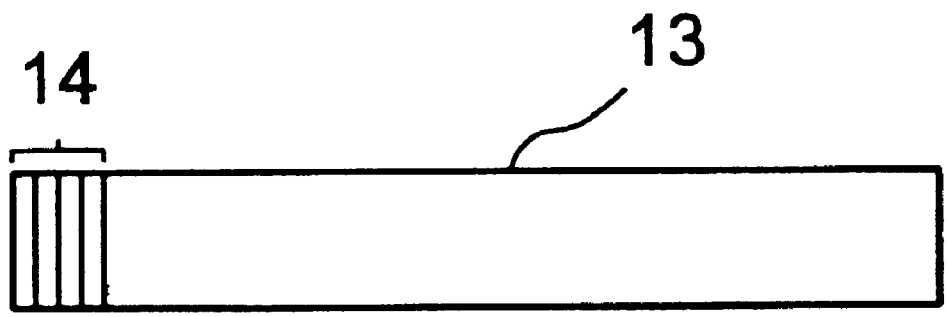
FIG. 2 is an illustration of a bit group used for data transmission in the network.

The received signals include continuously successive bit groups 13, as represented in FIG. 2, in which individual data channels are formed for source data or control data. The first four bit positions of each bit group 13 form a preamble 14.

Each received bit group 13 is pushed in a receive and transmit circuit 9 to 12 through a shift register, a FIFO memory or the like, in order to be able to selectively access the bits in the bit group 13. The bits of the preamble 14 are fed to a switching mechanism, a configuration of logic circuits, in which the preamble 14 is decoded. That is to say, the bits in the preamble 14 are used to detect that a preamble indicates a block start with which an oscillator or a PLL circuit of the subscribers 2 to 4 is synchronized. Moreover, in the case of an SPDIF format, the preamble 14 can be used to detect whether a received bit group is assigned to a left-hand or a right-hand channel.

The remaining bits of each bit group 13 can be fed to an electronic unit of the respective subscriber, for example an amplifier/loudspeaker combination, which converts audio data contained in the bit group 13 into acoustic signals. In this case, the bit group 13 is pushed essentially unchanged through the shift registers and fed into the ring feeder again. If the electronic device is a car radio, for example, it generally contains a microprocessor, which can write into the shift register in order, for example, to transmit audio data or control data to other subscribers. The bit groups which are thus changed are likewise fed again into the ring feeder.

Each receive and transmit circuit 9 to 12 normally contains a switch for direct electric connection of the optoelectronic input and output transducers when the corresponding subscriber is turned off.

In a first exemplary embodiment, this switch is not actuated when a subscriber enters a power-saving operation upon an external command or after the expiration of a preset time of inactivity. Rather, the receive and transmit circuit, including the internal oscillator of the subscriber, remains in operation, with the received signals being pushed in a transparent fashion through the shift register or the like and being fed again into the ring feeder. The switching mechanism in the receive and transmit circuits, through the use of which the preamble is decoded, likewise remains in operation. Apart from the clock pulse generator 1, all of the remaining parts of each subscriber 2 to 4, which are illustrated in a hatched manner in FIG. 1, can be turned off.

A special, not yet allocated bit sequence is provided as a wakeup preamble code upon the reception of which the switching mechanism of a subscriber 2 to 4 again switches on the hatched parts thereof.

When another subscriber transmits a message to this subscriber and receives no confirmation, it transmits the wakeup preamble code. As an alternative, a subscriber can transmit a wakeup preamble code as a precaution whenever it has not transmitted to the same subscriber over a lengthy time.

The four bits of the preamble shown in FIG. 2 permit a plurality of different wakeup preambles to be provided, for example one for waking up all of the subscribers in the ring, some for specifically waking up individual subscribers and, if appropriate, some for waking up a group of subscribers, for example all of the loudspeakers.

In a second exemplary embodiment, the optoelectronic input and output transducers are directly and electrically interconnected, that is to say the switch mentioned above is actuated when a subscriber enters a power-saving operation upon an external command or after the expiration of a preset time of inactivity. However, the received bit groups or at least their first four bit positions are monitored for the wakeup preamble code, as in the first exemplary embodiment. Apart from the input and output transducers, which naturally have to operate continuously, in this second exemplary embodiment only the receive part of the receive and transmit circuit 9, 10, 11 or 12 and the internal oscillator remain in operation when a subscriber enters a power-saving operation.

We claim:

1. A method for entering and leaving a power saving operation in a system including a plurality of subscribers connected in an annular communication network, each subscriber of the plurality of subscribers having a receive circuit turning part of the subscriber on upon receipt of at least one of a plurality of preamble codes, which comprises:

providing subscribers each having at least one receive circuit connected to the annular communication network;

transmitting data over the annular communication network in a format prescribing a pulsed sequence of individual bit groups of identical length having specific bit positions reserved for a preamble to be decoded in the receive circuit of each subscriber;

keeping at least part of each of the subscribers of the plurality of subscribers turned on during a power-saving operation of the subscriber;

turning on a part of some of the plurality of subscribers turned off during the power-saving operation upon reception of a first special preamble code by the receive circuit; and turning on a part of all of the plurality of subscribers turned off during the power-saving operation upon reception of a second special preamble code by the receive circuit.

2. The method according to claim 1, which comprises actuating a switch with the receive circuit for again turning on the part of the subscriber turned off when the receive circuit receives the at least one special preamble code.

3. The method according to claim 1, which comprises decoding the preamble with a switching mechanism in the receive circuit.

4. The method according to claim 1, which comprises keeping the receive circuit and an internal oscillator of the subscriber turned on and turning off a remainder of the subscriber, when the power-saving operation of a subscriber is entered.

5. The method according to claim 1, which comprises providing, in addition to the at least one special preamble code, at least one further preamble code for at least one of synchronizing the subscribers in the communication network and distinguishing between left-hand and right-hand channels.

6. The method according to claim 1, which comprises providing a ring feeder having optical fibers each interconnecting a respective two of the subscribers.

7. The method according to claim 6, which comprises placing at least some of the subscribers into the power-saving operation with a specific instruction conveyed through the ring feeder.

8. The method according to claim 1, which comprises automatically placing at least some of the subscribers into the power-saving operation after a fixed time of inactivity.

9. A method for entering and leaving a power saving operation in a system including a plurality of subscribers connected in a mobile annular communication system, each subscriber of the plurality of subscribers having a receive circuit turning part of the subscriber on upon receipt of at least one of a plurality of preamble codes, which comprises:

providing subscribers each having at least one receive circuit connected to the mobile annular communication system;

transmitting data over the mobile annular communication system in a format prescribing a pulsed sequence of individual bit groups of identical length having specific bit positions reserved for a preamble to be decoded in the receive circuit of each subscriber;

keeping at least part of each of the subcribers of the plurality of subscribers turned on during a power-saving operation of the subscriber;

turning on a part of some of the plurality of subscribers turned off during the power-saving operation upon reception of a first special preamble code by the receive circuit; and turning on a part of all of the plurality of subscribers turned off during the power-saving operation upon reception of a second special preamble code by the receive circuit.

10. A method for entering and leaving a power-saving operation in a system including a plurality of subscribers connected in a mobile annular communication system in a motor vehicle, each subscriber of the plurality of subscribers having a receive circuit that turning part of the subscriber on upon receipt of at least one of a plurality of preamble codes, which comprises:

providing subscribers each having at least one receive circuit connected to the mobile annular communication system in a motor vehicle;

transmitting data over the annular communication network in a format prescribing a pulsed sequence of individual bit groups of identical length having specific bit positions reserved for a preamble to be decoded in the receive circuit of each subscriber;

keeping at least part of each of the subscribers of the plurality of subscribers turned on during a power-saving operation of the subscriber;

turning on a part of some of the plurality of subscribers turned off during the power-saving operation upon reception of a first special preamble code by the receive circuit; and turning on a part of all of the plurality of subscribers turned off during the power-saving operation upon reception of a second special preamble code by the receive circuit.

* * * * *